May 30, 1967 T. F. BALLISTER 3,322,201
LAWN EDGE TRIMMER ATTACHMENT
Filed Sept. 28, 1964

INVENTOR.
BY Thomas F. Ballister

United States Patent Office 3,322,201
Patented May 30, 1967

3,322,201
LAWN EDGE TRIMMER ATTACHMENT
Thomas F. Ballister, 305 E. Cook St.,
Santa Maria, Calif. 93454
Filed Sept. 28, 1964, Ser. No. 399,635
7 Claims. (Cl. 172—14)

The invention relates to improvements in a lawn edge trimmer and more particularly to a lawn edge trimmer attachment to go on a lawn mower, hand or power operated.

Heretofore, independent lawn edge trimmers to cut the edge of a lawn have quite commonly been used. But such use is laborious and time consuming. The inventor of the device herein described has after repeated use of such independent lawn edge trimmers, come to recognize that to combine and use a lawn edge trimmer with a conventional lawn mower would be much easier and more accurate in trimming the edge of the lawn than using a separate, independent lawn edge trimmer and moreover would save the time consumed by the use of such separate, lawn edge trimmer. But in using the combination of a lawn edge trimmer with a conventional lawn mower, as well as using the separate, independent hand lawn edge trimmer, considerable difficulty was encountered in keeping the rotary cutter wheel of the trimmer from riding up out of the ground as the trimmer was moved forwardly. The problem was to maintain enough downward pressure on the cutter wheel to keep it from popping up all during the cutting operation. After repeated redesigning and experiment the inventor has discovered that the arm of his connecting structure of the lawn edge trimmer which connects with the frame of the lawn mower must extend at least at a minimum critical angle of inclination with respect to the ground such that the force propelling the lawn mower will maintain sufficient downward pressure on the edge trimmer wheel to prevent its popping up when lowered in use as it is advanced along the ground.

Thus the object of this invention is to provide a combination lawn mower and lawn edge trimmer wherein the edge trimmer when set in a lowered operative position will be urged to remain in said lowered operative position during the entire mowing operation of the lawn mower.

A further object of this invention is to provide a simply and easily attachable lawn edge trimmer attachment for use on a conventional lawn mower, which attachment is detachable and can readily, easily and quickly be removed when its use is not desired.

A still further object of this invention is to provide a lawn edge trimmer accessory on a lawn mower, which accessory is readily and quickly and easily foldable from a use to non-use position, to enable the use of the lawn mower alone when away from the edge of the lawn.

Yet another object of this invention is to make a lawn edge trimmer attachment for a lawn mower, that is strong, durable, of few parts that can easily and cheaply be manufactured.

The above objects are illustrated herein and further objects may appear by reference to the accompanying drawings, in which FIG. 1 is a perspective view of the lawn edge trimmer attached to a lawn mower and set in lowered, downward cutting position.

Figure 1:
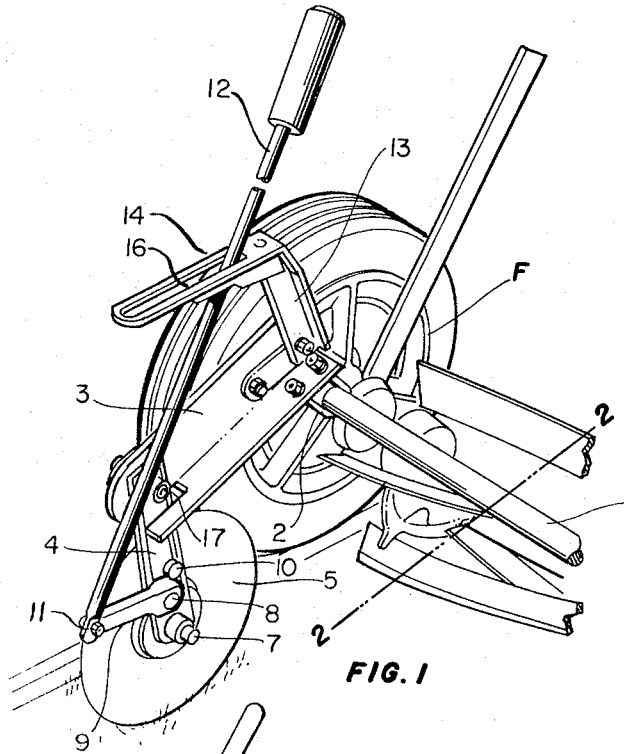
Figure 4:
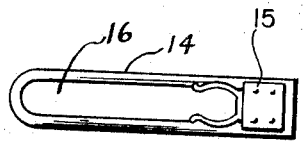
FIG. 4 is a detail view showing the lock to hold the handle and lawn edge trimmer in upper inoperative position.
Figures 2, 3:
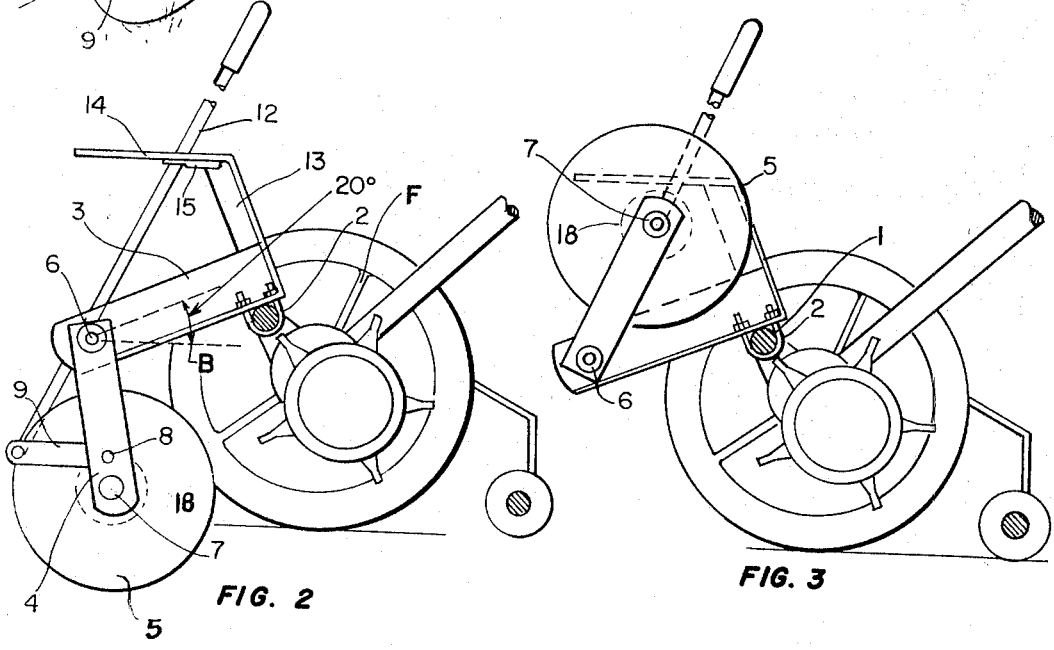
FIG. 2 is side elevational view of the lawn edge trimmer taken along the line 2—2 of FIG. 1.
FIG. 3 is side elevational view similar to FIG. 2 but showing the lawn edge trimmer locked in upper non-use position.

Referring to the drawings, the mower has a frame F comprising two side pieces, one of which is shown, interconnected by a cross rod 1, rigidly connected to said side frames. An angle iron thrust bar 3 is firmly secured at its rear end to the cross rod 1 by a pair of U bolts 2. The thrust bar 3, extends downwardly and forwardly from the cross rod 1 at an angle, B to the horizontal, as shown in FIG. 2. Extending downwardly from the front end of the thrust bar 3 as shown in FIGS. 1 and 2 is a support arm 4, pivoted at its upper end at 6 to the thrust bar 3. At its lower end the support arm 4 rotatably carries at 7 the circular cutter or lawn edge trimmer 5, which includes a wood, rubber or the like roller 18 on the outside to roll on the sidewalk to cause or assist cutter 5 to rotate. Toward its upper end the support arm 4 rides in a slot 17 in the lower flange of the angle iron thrust bar 3. The rear end of slot 17 serves as a stop to limit the rearward swing of support arm 4. An actuator link 9 is pivoted at its rear end at 8 toward the lower end of support arm 4. A handle 12 is pivoted at its lower end at 11 to the front or outer end of actuator arm 9. A stop pin 10 on support arm 4 limits the upward swing of actuator link 9 when the edge trimmer 5 is moved to its inoperative or stored upper position as shown in FIG. 3 when its use is not desired. Fixed to the rear end of the thrust bar 3 is an upwardly extending angle bracket 13 having a forwardly extending bracket arm 14 which has a slot 16 receiving and holding the handle 12 against lateral movement. On its lower side the bracket arm 14 carries a springlock 15 to hold the handle 12 and lawn edge trimmer in set upper inoperative position.

As indicated above previously great difficulty has been experienced in holding the cutter or edge trimmer down into the ground in operative position. Refer to FIG. 2. After repeated change of design of my attachment, I have discovered by making the angle of inclination B of the thrust bar 3 at least 20 degrees, I prevented the edge trimmer or cutter 5 from popping up in operation and thus made the device satisfactorily and continuously operative.

I am aware that other lawn edge trimmer attachments that do not pop up in action may be applied to lawn mowers within the purview of my invention, and I do not intend to be limited to the specific structure disclosed herewith but only to the extent set forth in the appended claims, wherein I claim:

1. In combination a lawn mower having a frame, a thrust bar secured to the frame at one side of the frame, said thrust bar extending forwardly and downwardly at an angle to the horizontal no less than 20 degrees, and means securing a lawn edge trimmer to the thrust bar forwardly of the point of attachment of said thrust bar with said frame, said securing means comprising a support arm secured to the forward end of the thrust bar, said support arm extending downwardly from the thrust bar, said trimmer comprising a cutter member rotatably secured to the lower end of the support arm, said support arm being pivotally secured to said thrust bar, said thrust bar being an angle iron having an inwardly extending flange along its lower edge, said flange having a longitudinally extending slot at its forward end in which the upper end of said support arm rides, the rear end of said slot serving as a stop to limit the rearward swing of said support arm.

2. The combination as set forth in claim 1, means for moving said cutter member to an upper inoperative stowed position, and means to hold said cutter member in said inoperative, stowed position.

3. The combination as set forth in claim 2, said means for moving said cutter member to said upper position comprising a forwardly extending actuator link pivoted at its rear end toward the lower end of the support arm and extending forwardly of the support arm, an elongated handle pivoted at one end to the forward end of the actuator link and extending upwardly and engaging said cutter member holding means.

4. The combination as set forth in claim 3, said cutter member holding means comprising an upwardly extending angle bracket having a generally vertical leg portion secured at its lower end to the rear end of the thrust bar, said angle bracket having at the upper end of its vertical leg portion a horizontally extending flat bracket arm, a longitudinal slot in said bracket arm, said elongated handle extending through said slot, and a lock means on the underside of said bracket arm and engaging said elongated handle, said support arm having a stop pin to engage and limit the upward swing of the actuator link when the cutter member is moved to its upper stowed position.

5. A lawn edge trimmer attachment for use on a lawn mower comprising a thrust bar adapted to extend forwardly from the lawn mower at an angle of at least 20 degrees to the horizontal, means for detachably securing the rear end of said thrust bar to said lawn mower, a downwardly extending support arm secured at its upper end to the forward end of said thrust bar, a circular lawn edge cutter rotatably secured to the lower end of said support arm, said thrust bar having U-bolt means for attaching said thrust bar to a cross bar on the frame of a lawn mower, said thrust bar being an angle iron having a longitudinal lower flange extending inwardly, said flange having a longitudinal slot in its forward edge, said support arm being pivoted at its upper end to the forward end of the thrust bar, the rear edge of said slot limiting the rearward swing of said support arm.

6. The combination as set forth in claim 5, means for moving said lawn cutter to an upper inoperative, stowed position, and means to hold said cutter in the upper inoperative, stowed position.

7. The combination as set forth in claim 6, said means for moving the cutter comprising an actuator link extending forwardly of and pivoted at its rear end toward the lower end of the support arm, an upwardly extending elongated handle pivoted at its lower end to the forward end of said actuator link, said holding means comprising an upwardly extending angular bracket, the vertical leg of said bracket being fixedly secured at its lower end to the rear end of the thrust bar, said angular bracket having a horizontal, flat, forwardly extending bracket arm ridgidly secured at its rear end to the upper end of said bracket leg, said bracket arm having an elongated longitudinal slot therein receiving said elongated handle, a lock means on the lower face of said bracket arm engaging said elongated handle to hold the cutter in upper, inoperative, stowed position, said support arm having a stop pin thereon above the actuator link to engage and limit the swing of the actuator link when the cutter is moved to upper, inoperative stowed position.

References Cited
UNITED STATES PATENTS

| | | | |
|---|---|---|---|
| 1,065,946 | 7/1913 | Janson | 56—251 |
| 2,676,447 | 4/1954 | Asbury | 56—256 X |
| 2,775,856 | 1/1957 | Hoch | 172—14 X |
| 3,019,585 | 2/1962 | Wellborn | 56—251 X |
| 3,057,411 | 10/1962 | Carlton | 172—15 |
| 3,079,743 | 3/1963 | Egley | 172—15 X |

ABRAHAM G. STONE, *Primary Examiner.*

WILLIAM A. SMITH III, A. E. KOPECKI, *Examiners.*